J. H. Kendrick.
Horse Hay-Fork.
Nº 70002. Patented Oct. 22, 1867.
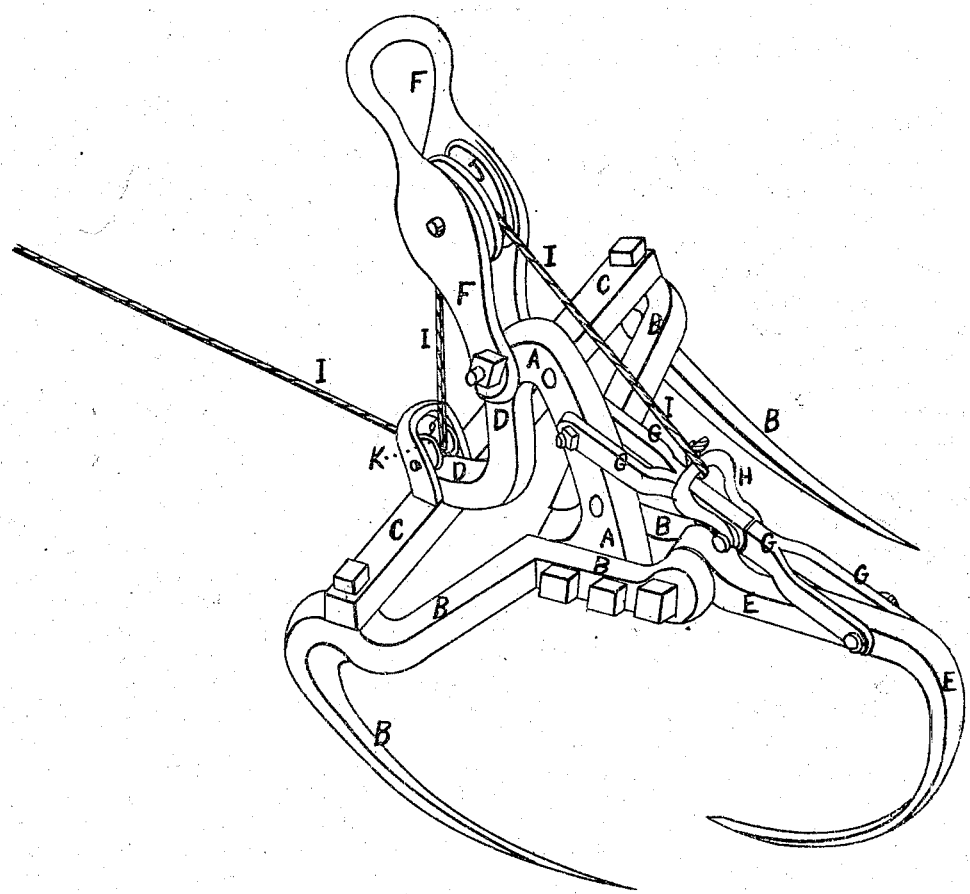
Witnesses.
Theo Tusche
Wᵐ Trewin
Inventor.
J H Kendrick
Per Munn & Co
Attorneys

United States Patent Office.

JACOB H. KENDRICK, OF DEXTER, MICHIGAN.

Letters Patent No. 70,002, dated October 22, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, JACOB H. KENDRICK, of Dexter, in the county of Washtenau, and State of Michigan, have invented a new and useful Improvement in Horse Hay-Fork; and I do hereby declare that the following is a full, clear, and exact description thereof, which will enable those skilled in the art to make and use the same, reference being had to the accompanying drawings, forming part of this specification, in which the figure is a perspective view of my improved horse hay-fork.

Similar letters of reference indicate corresponding parts.

My invention has for its object to furnish an improved horse hay-fork, simple and strong in construction, easily operated, and effective in operation; and it consists in the construction and combination of the various parts, as hereinafter more fully described.

A is the draw-standard, to the lower end of which are bolted the ends of the two back tines B, which are made in substantially the shape shown in the figure. The tines B are connected and strengthened, at the point where they begin to curve downward, by the cross or brace-bar C, which is securely bolted to them. Upon the upper end of the draw-standard A is formed, or to it is attached, the brace-bar D, the lower end of which is secured to the central point of the brace-bar C, as shown in the drawing. E is the front tine, the upper end of which is pivoted to and between the upper ends of the back tines B, in front of the lower end of the draw-standard A, by a bolt passing through the said ends of the said tines. F is the clevis or block to which the rope is attached for raising the fork, and which is attached to the upper end of the standard A by a bolt passing through the said block, and through one or the other of the two holes through the upper end of the said standard, so that the draught upon the fork may be changed as desired. G is the trip-brace, which is made with a knee or lock-joint at its centre, at which point is attached the clevis H, to which the trip-rope I is attached. The lower end of the trip-brace G is pivoted to the horizontal part of the front tine E, and its upper end is pivoted to the draw-standard A, several holes being formed in the said standard for this purpose, so that by raising or lowering the inner end of the said brace-bar, the grasp of the tines may be expanded or contracted, according to the coarseness or fineness of the hay to be handled. The trip-rope I, from the clevis H, passes over a pulley, J, pivoted in the block F, over a pulley, K, pivoted to the brace-bars C and D at the point where the said bars intersect, and thence to a convenient position to be reached and operated by the operator.

By this construction the weight of the hay holds the fork locked, so that it cannot escape until the trip-brace G is raised by the trip-rope I. The weight of the hay then spreads the tines apart, so that they drop the hay.

I claim as new, and desire to secure by Letters Patent—

1. The adjustable jointed trip-brace G, in combination with the tine E, standard A D, and pulley-block F and clevis H, all constructed as described, for the purpose specified.

2. The combination and arrangement of the curved standard A, tines B E, brace-bars C D, adjustable jointed trip-brace G, clevis H, pivoted pulley-block F, pulley K, on the brace-bar C, all constructed and operating as described, for the purpose specified.

JACOB H. KENDRICK.

Witnesses:
 SIMEON MAINS,
 ISAAC MAINS.